United States Patent
Bassler et al.

(10) Patent No.: US 9,783,321 B1
(45) Date of Patent: Oct. 10, 2017

(54) RETRACTABLE VERTICAL FLOW-CONTROL DEVICE FOR TOPSIDE MITIGATION OF AIRWAKES OVER SHIP FLIGHT DECKS

(71) Applicants: Christopher C. Bassler, Arlington, VA (US); William Scott Weidle, Boston, MA (US); Nicholas D. Rosenfeld, Rockville, MD (US)

(72) Inventors: Christopher C. Bassler, Arlington, VA (US); William Scott Weidle, Boston, MA (US); Nicholas D. Rosenfeld, Rockville, MD (US)

( * ) Notice: Subject to any disclaimer, the term of this patent is extended or adjusted under 35 U.S.C. 154(b) by 0 days.

(21) Appl. No.: 15/192,260

(22) Filed: Jun. 24, 2016

(51) Int. Cl.
*B63B 1/38* (2006.01)
*B64F 1/04* (2006.01)
*B63B 35/50* (2006.01)

(52) U.S. Cl.
CPC ............. *B64F 1/04* (2013.01); *B63B 35/50* (2013.01)

(58) Field of Classification Search
CPC .................................. B63B 35/50; B64F 1/04
USPC .................................. 114/176, 178, 117, 273
See application file for complete search history.

(56) References Cited

U.S. PATENT DOCUMENTS

| | | | | |
|---|---|---|---|---|
| 4,843,997 A * | 7/1989 | Doehmel | ............... | B63B 17/00 114/382 |
| 5,724,906 A * | 3/1998 | Lee | ............... | B63B 15/00 114/71 |
| 6,209,471 B1 * | 4/2001 | Oomen | ............... | B63B 43/32 114/117 |
| 6,959,958 B2 * | 11/2005 | Basford | ............... | B62D 35/001 296/180.1 |
| 8,001,918 B2 * | 8/2011 | Mitsui | ............... | B63B 1/06 114/273 |
| 2013/0025520 A1 * | 1/2013 | Hall | ............... | B63B 19/00 114/117 |

OTHER PUBLICATIONS

Yaragal, et al., "An experimental investigation of flow fields downstream of solid and porous fences." Jnl of Wind Engineering and Industrial Aerodynamics 66 (1997) 127-140.
Kaaria, et al. "An experimental technique for evaluating the aerodynamic impact of ship structures on helicopter operations." Ocean Engineering 61 (2013) 97-108.

* cited by examiner

*Primary Examiner* — Stephen Avila

(57) ABSTRACT

The disclosed invention is a passive flow control device, mounted vertically forward of the helicopter launch and recovery area on a ship flight deck. The vertical flow control device reduces the airwake effect on the ship flight deck for safer operation of helicopters during launch and recovery missions from ships. The device is retractable to reduce the ships topside signature and increase the ship's military effectiveness. It can also be modified for maximum effectiveness based on a combination of the ship's topside features, the ship's operation speeds, helicopter operations, and environmental conditions.

10 Claims, 6 Drawing Sheets

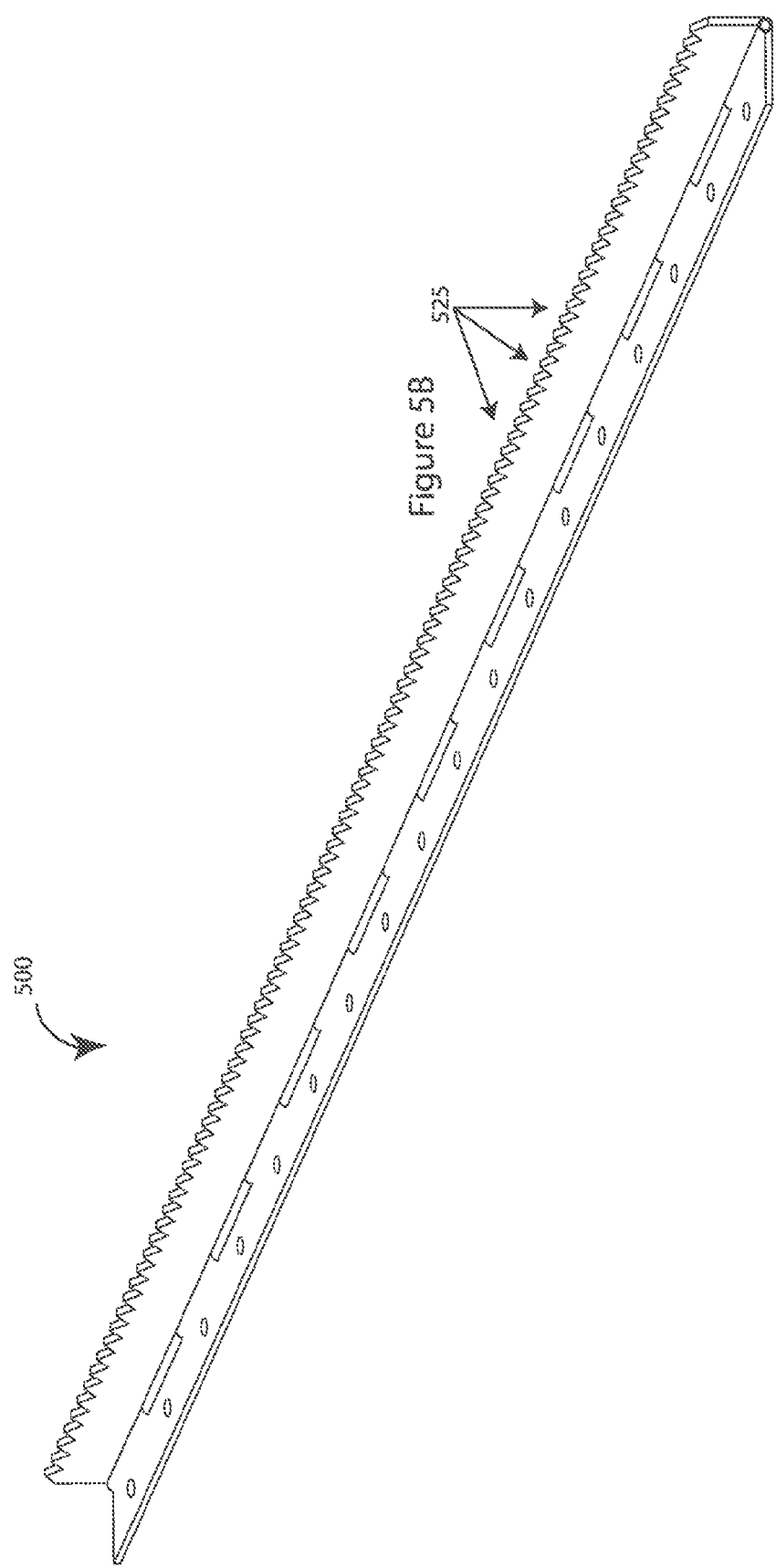

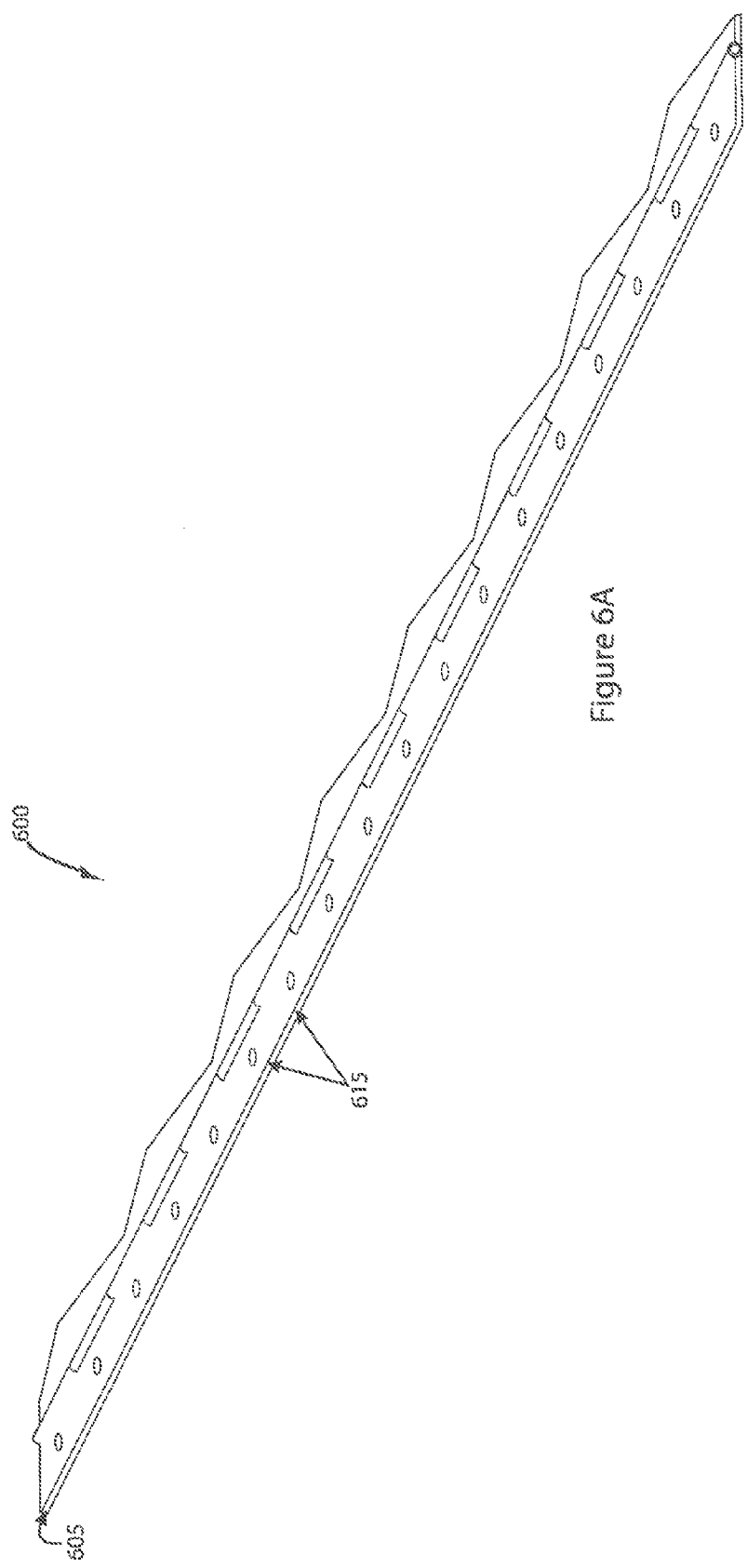

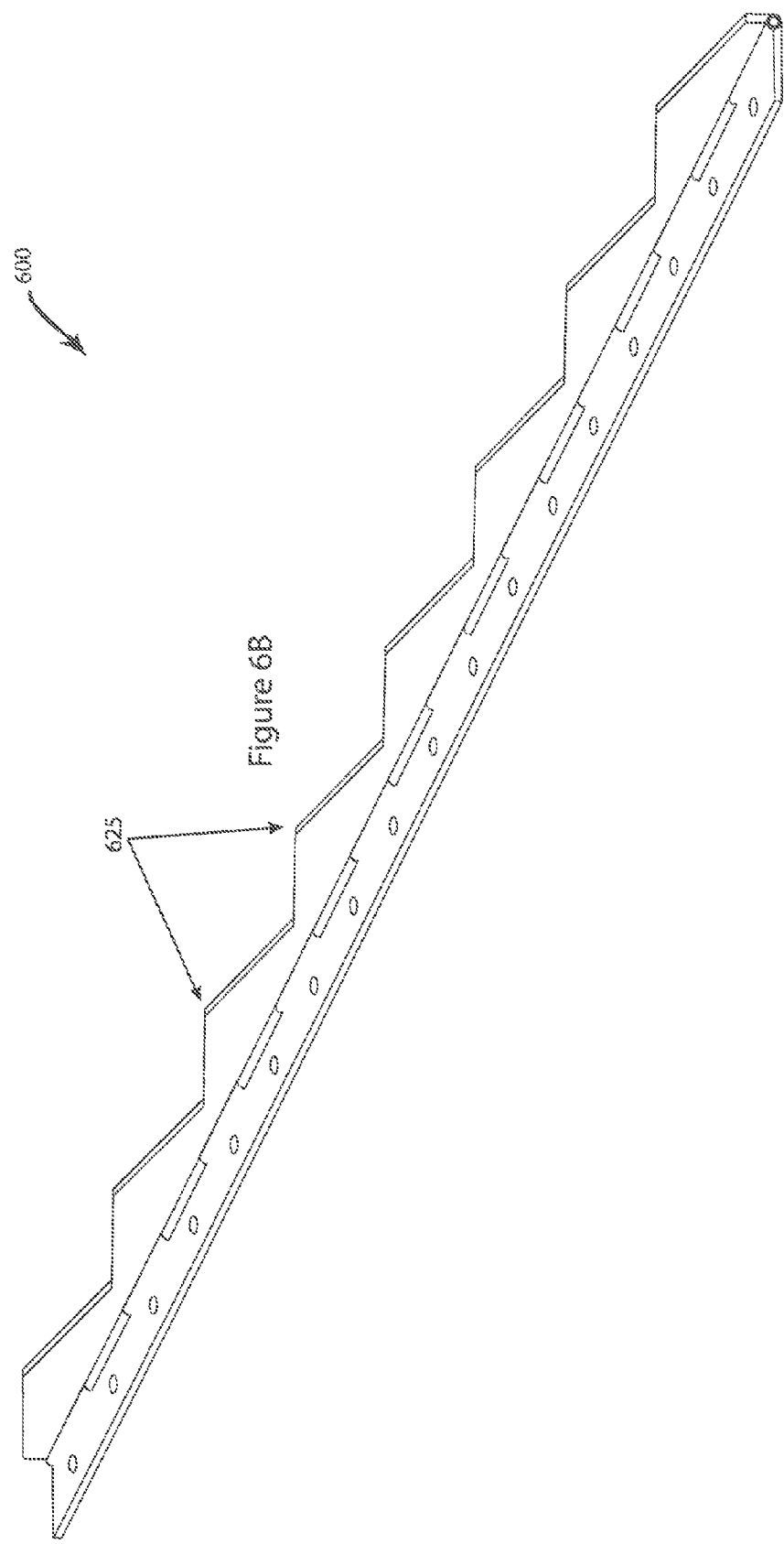

RETRACTABLE VERTICAL FLOW-CONTROL DEVICE FOR TOPSIDE MITIGATION OF AIRWAKES OVER SHIP FLIGHT DECKS

STATEMENT OF GOVERNMENT INTEREST

The invention described herein may be manufactured and used by, or for the Government of the United States of America, for governmental purposes without payment of any royalties thereon or therefore.

BACKGROUND

Launching and recovering aircraft from ship flight decks is very challenging because of the small size of the flight deck and the movement (pitch, roll, etc.) of the ship as it travels through the water. This is especially true for smaller ships like frigates and destroyers that launch and recover rotary wing aircraft. In addition, most of these ships have superstructures, functioning has aircraft hangars, in front of the flight deck. The ship's geometry, along with the combined effect of prevailing winds and the forward motion of the ship, creates an air flow over and around the ship's superstructure resulting in an air wake behind the superstructure on the ship's flight deck. This air wake is often a turbulent and unsteady vortex on the flight deck creating difficulties with aircraft maneuverability on and around the flight deck.

The ship's superstructure is essentially a combination of bluff bodies. The air flow separates from the sharp edges of the hangar forming shear layers and low-speed recirculation zones leading to large spatial and temporal velocity gradients in the airflow over the flight deck. Vortical flow structures are shed from the hangar and other large-scale features on the superstructure. These vertical flow structures typically have length scales similar to a helicopter's fuselage and main rotor. Therefore, as the pilot moves the helicopter through the air wake during take-offs and landings, the highly unsteady airflow causes large fluctuations in the aerodynamic loading on the rotor and fuselage that adversely affect the helicopter's lift and thrust on take-offs and landings. The air vortex can also significantly disturb the aircraft's flight path as the aircraft responds to the influence of the ship's air wake. These factors, combined with poor visibility and water spray can significantly increase pilot workload. Consequently, the margins for pilot error can be significantly reduced, which increases the frequency and severity of accidents and crash landings.

The impact on flight decks and pilot workload, caused by these superstructure air wakes has not been fully appreciated in ship design. Although studies have shown benefits of placing flow control devices on ship superstructures to control the air flow around the vessel and increase aircraft maneuverability during takeoff and landing, these studies have only examined modifications applied to the rearmost edges of the ships hangar to mitigate the effect of superstructure vortices to the front of the carrier flight deck as shown in FIGS. 1 and 2. These types of flow control devices have had only a slight to moderately positive, and sometimes negative, effect on the reduction of flight deck air wake.

FIG. 1, shows several configurations, where air flow control structures extended upward from the top, aft edge of the hangar. In these locations, the structures obstruct views of the flight deck and also interfere with radar and radio communications signals to the aircraft. In other configurations, the flow control structures extend from the ends of each side of the hanger toward the flight deck. These configurations offer little to no airflow break-up and also reduce the usable area around the flight deck. Moreover, these structures are fixed in their positions, making them permanent obstructions to the radar and radio communications signals, as well as the usable flight deck area.

Flow control structures have also been placed along the top edge, starboard side of the superstructure, as shown in FIG. 2. These structures extend out parallel to the air flow along the side of the ship, offering little to no resistance as a streamlined airflow field passes over and around them. Therefore, air vortexes typically form on the ships flight deck with the same intensity as they would have without these flow control structures in place. Consequently, a more effective flow control device is desired.

SUMMARY

This invention substantially reduces ship superstructure air wakes by vertically mounting a retractable flow control device on the side of the ship's superstructure. The retractable portion of the device is rotated perpendicularly to the side of the ship's superstructure when being used to modify air flow. The device is vertically mounted to the side of the ship's superstructure, away from the hanger, and forward of the flight deck. This placement of the flow control device substantially breaks up the airflow along the sides of the ship, thereby reducing the magnitude of the vortexes created on the ship's flight deck.

The flow control device comprises two plates connected by a hinge. The two plates of the passive vertical flow control device are hinged so that the rotating plate may be retracted during normal ship operations to reduce the ship's topside radar signature, maximize military effectiveness and minimize required maintenance. The flow control device is vertically mounted on the side of the ship's superstructure, towards the aft end of the ship, just forward of the ship's flight deck.

One of the hinged plates is fixed to the side of the ship's superstructure. This plate can be fixed to the superstructure with hydraulic pins or other mounting accessories as applicable. The other hinged plate is retractable between a non-operational position flush against the side of the ship's superstructure and an operational position perpendicular to the side of the ship's superstructure. When a rotary aircraft is maneuvering around the flight deck, the second side of the hinged plate is rotated to its operational position perpendicular to the side of the superstructure. When no air craft is in play, the second hinged plate is retracted to the position flush against the side of the ship's superstructure.

The edge of the retractable side of the hinged plate may take any shape optimized to modify and control the air flow toward the ship's flight deck. Various saw tooth, wave, block and other plate edge configurations work with this invention. The optimized shape is determined by a combination of the ship's topside features and operational speeds, along with helicopter operations, and environmental conditions (e.g. wind speeds).

DRAWINGS

FIG. 5B is an embodiment of the inventive flow control device with a fine toothed serrated edge on the retractable plate, in an open position.

FIG. 6A is an embodiment of the inventive flow control device with a course toothed serrated edge on the retractable plate in a closed position.

FIG. 6B is an embodiment of the inventive flow control device with a course toothed serrated edge on the retractable plate in an open position.

DETAILED DESCRIPTION

The vertical flow control device is installed on an upstream aft edge side of the ship's superstructure, providing increased flow field control of the air over the ship's flight deck. Because the flow control device is upstream, it breaks up the air flow just prior to the flight deck, reducing the opportunity for the air to form a vortex on the flight deck. As air moves along the side of the vessel, the vertical positioning of the flow control device allows for improved control of the air flow field, which is influenced by the ship's topside geometry, the ship's speed and the wind. Because it is retractable and vertical, the flow control device preserves the ship's topside design effectiveness when not in use, while also providing improved helicopter launch and recovery capability while deployed. The serrated edges provide a means to break-up air vortex structures, to enable higher rates of dissipation and improve helicopter handling during flight deck launch and recovery operations from the ship.

Figure 2:
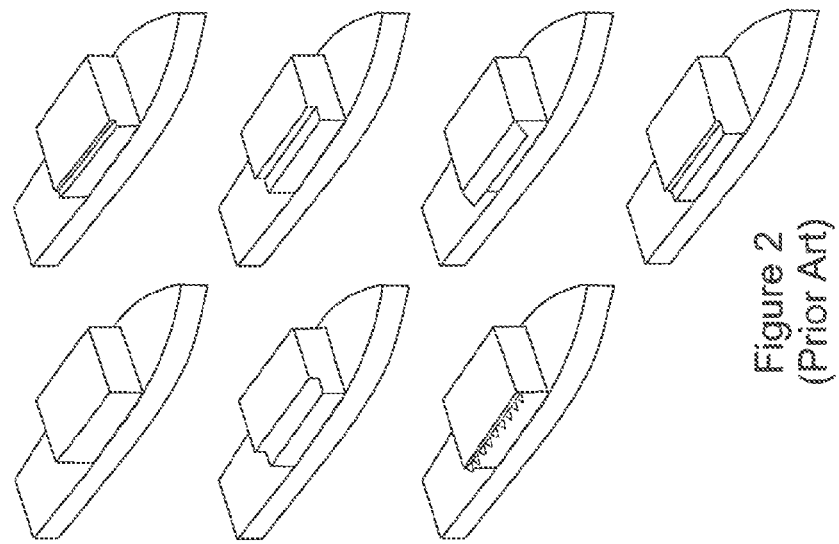
FIG. 2 shows prior art embodiments of flow control devices installed horizontally on the top edge a ship's superstructure
Figure 1:
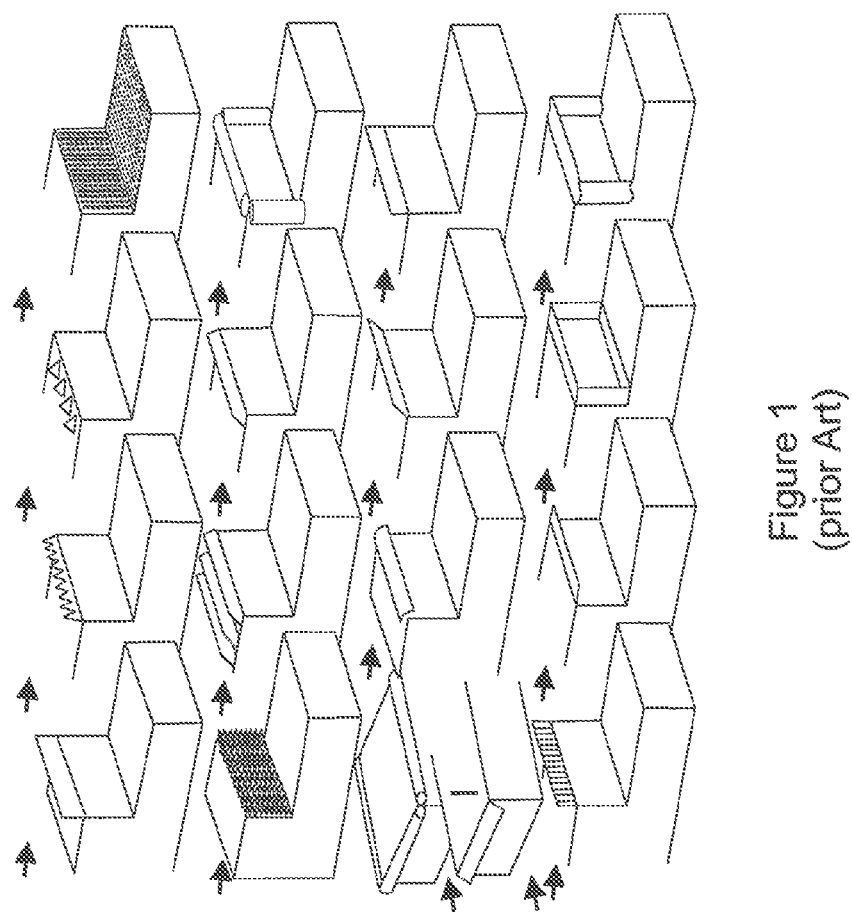
FIG. 1 shows prior art embodiments of flow control structures mounted on and extending up from the top, aft edge of the ship's superstructure along with embodiments of flow control structures extending from the edges of the ships hanger, onto the ship's flight deck.
Figure 3:
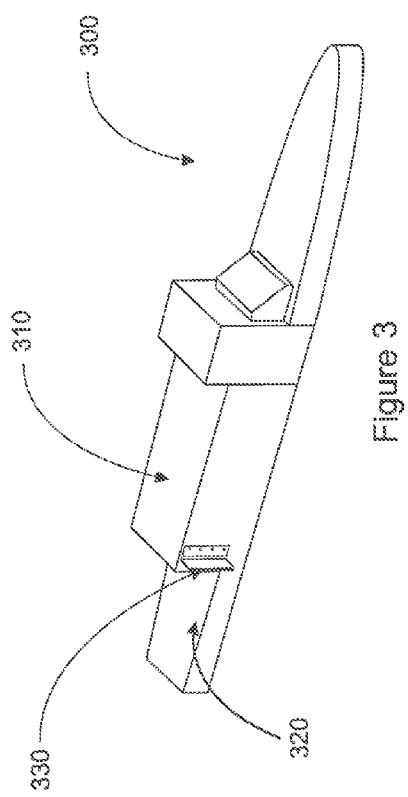
FIG. 3 is an embodiment of the inventive flow control device vertically mounted toward the aft end of a ship's superstructure.
Figure 4:
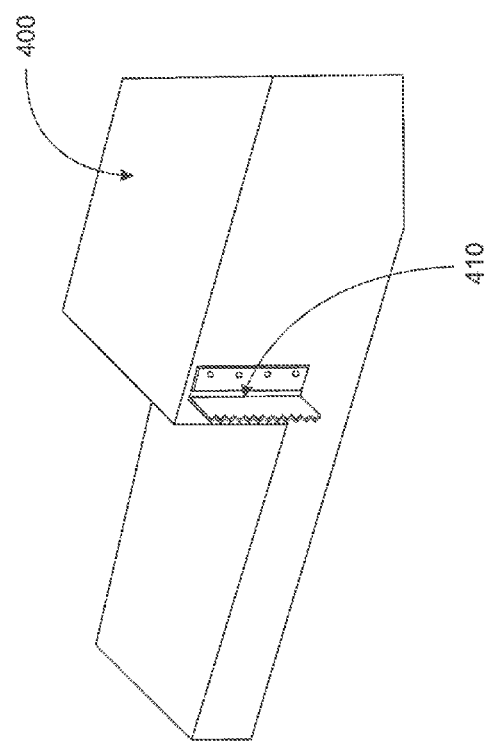
FIG. 4 is a close-up of an embodiment of the inventive flow control device mounted toward the aft end of a ship's superstructure.

FIG. 3 shows a simplified representation of a typical ship (300) on which this invention is used. However, this invention is applicable to any ship with a rotary aircraft flight deck. The ship has a superstructure (310) forward of the flight deck (320). The flow control device (330) is shown mounted vertically on a side of the ship's superstructure (320) toward the superstructure's aft end. FIG. 3, shows the vertical flow control device (330) on one side of the superstructure (300). However the device is, ideally, deployed on both the port and starboard sides of the superstructure (300). The vertical flow control device is mounted relatively close to the flight deck to break up the air wake vortex structures just prior to them forming on the flight deck. FIG. 4 is a close-up of an embodiment of the vertical flow control device (410) mounted on the side of a ship's superstructure (400).

Figure 5A:
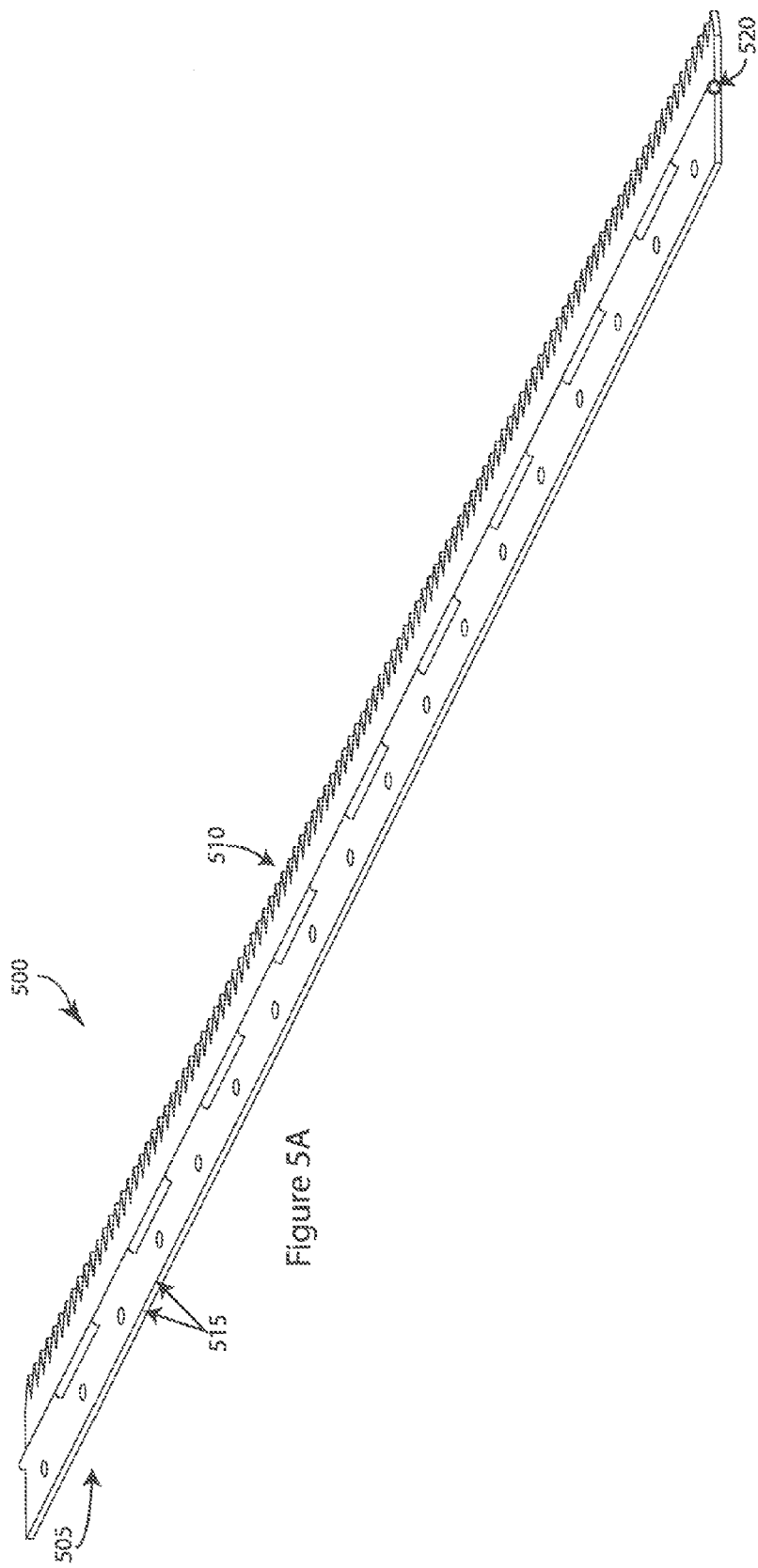
FIG. 5A is an embodiment of the inventive flow control device with a fine toothed serrated edge on the retractable plate in a closed position.

FIGS. 5A and 5B show an embodiment of the invention with a fine toothed serrated edge and a left-right, closed-open configuration. FIG. 5A shows the vertical flow control device (500) in its closed position, while FIG. 5B shows the vertical flow control device (500) in its open position. The left side of the vertical flow control device (505) is designed to be fixed to the ship's superstructure. It contains holes (515) to accommodate hydraulic pins (not shown) that secure the flow control device to the side of the ship's sub structure.

The hydraulic pins can be a manufactured in a variety of diameters and lengths, and from various materials to accommodate multiple iterations and ship installations of the vertical flow control device. Also, alternative means of securing the vertical flow control device to the ship's superstructure can be used, such as springs or the like.

The chosen materials of the vertical flow control device can vary depending on the ships features (size, weight, design etc.) as well as the expected level of air flow based on the ship's speed capability and the severity of the winds the ship is expected to encounter. Likewise, the design of the hydraulic pins will vary accordingly.

The left side of the vertical flow control device (505) is connected to the right side of the vertical flow device (510) with a hinge (520). The hinge (520) allows the right side of the device (510) to rotate between a flat position, as shown in FIG. 5A, that will be flush against the side of the ship's superstructure and an upright position as shown in FIG. 5B, where a serrated edge (525) of the right side of the device (510) extends from the side of the ship's superstructure at an angle of ninety degrees. The retractable right side of the device (510) can also be fixed at other angles for varying effects on airflow. The vertical flow control device can also have a right-left closed-open configuration to accommodate various ship designs.

The serrated edges (525) on the right side of the vertical flow control device (510) are designed based on a combination of factors, including ship design, ship speed, and type of air craft to be operated on the ship. The serrated edges (525) break up large air vortex structures from the ship's topside, leading to smaller amplitude airflows and air wake vortex structures of reduced intensity. This enables better aircraft handling for launch and recovery from the ship's flight deck. The edge of the vertical flow control device may be manufactured with various degrees of serration or other designs to accommodate different levels of flow resistance required by different types of vessels.

FIGS. 6A and 6B show an alternate embodiment of the invention with a coarse toothed serrated edge, and a left-right, closed-open configuration. Like the previous embodiment, this alternate embodiment of the vertical flow control device (600) retracts between a closed, flat position as shown in FIG. 6A that will be flush against the ship's superstructure when not in use and an open position with a ninety degree angle between the two sides of the hinge. In this embodiment the serrated edges (625) of the right side of the flow device (610) are coarser. The serrated edges (625) are wider and further apart to accommodate a ship with a larger geometry that launches larger helicopters, requiring the break-up of larger air vortexes.

The vertical flow control device (600) can be adjusted between its open and closed positions by hand or, in alternate embodiments, with a motor (not shown). The vertical flow control device (600) is installed further upstream of the superstructure edge, providing increased flow field control over the flight deck. The vertical positioning of the flow control device allows for improved control of the air flow field as air moves along the side of the vessel. Because the vertical flow control device disrupts and dissipates vortex air structures just prior to their transit to the flight deck, aircraft operations on and around the flight deck are less affected making the ship and ship board operations much safer. The retractable nature of the device also preserves topside design effectiveness. The serrated edges provide a means to break-up vortex structures, to enable higher dissipation and improved helicopter handling during flight deck launch and recovery operations from the ship.

Additional embodiments include various upstream and downstream placements of the device on the ships superstructure, as well as alternative plate edge shapes to accommodate the ship's topside geometry, the helicopter operations, ship speed, and environmental conditions during shipboard helicopter operations.

Although the invention has been described in detail with particular reference to preferred embodiments, other embodiments can achieve the same results. Variations and modifications of the present invention will be obvious to those skilled in the art and it is intended to cover, in the appended claims, all such modification and equivalents. The entire disclosure and all references, applications, patents and publications cited above are hereby incorporated by reference.

What is claimed is:

1. A flow control device for mitigating superstructure air wakes on a ship flight deck comprising:
    a hinged plate vertically mounted to a side of the superstructure, comprising:
        a first plate with a hinged edge, an un-hinged edge;
        a second plate with a hinged edge and an un-hinged edge; and
        a hinge connecting the hinged edge of the first plate to the hinged edge of second plate, wherein
            the first plate has holes machined into it for mounting the flow control device to the side the superstructure, and wherein
            the first plate is secured flush against the side of the superstructure with hydraulic pins placed through the machine holes, and wherein
            the second plate is retractable, on the hinge, between a position flush against the side of the superstructure and a position perpendicular to the side of the superstructure.

2. The flow control device of claim 1, wherein the hinged plate is vertically mounted to the side of the superstructure toward an aft end of the superstructure, just forward of the ship flight deck.

3. The flow control device of claim 1, wherein the un-hinged edge of the second plate is serrated to optimize airflow reduction.

4. The flow control device of claim 3, where the second plate is serrated based on ship geometry, ship operational conditions, environmental conditions, and aircraft operations.

5. The flow control device of claim 1, wherein a motor is connected to the hinge and the second plate to rotate the second plate between the position flush against the side of the superstructure and the position perpendicular to the side of the superstructure.

6. A flow control device for mitigating air wakes behind a ship superstructure, on a flight deck comprising:
    a first plate;
    a second plate; and
    a hinge connecting an edge of the first plate to an edge of the second plate;
    wherein,
        the flow control device is vertically mounted to a side of the ship superstructure by securing the first plate to the side of the ship superstructure; and
    wherein,
        the second plate rotates on the hinge between a position flush against the side of the ship's superstructure and a position perpendicular to the side of the ship's superstructure, and
    wherein
        the first plate is secured to the side of the ship superstructure with hydraulic pins inserted through holes machined into the first plate.

7. The flow control device of claim 6, wherein the flow control device is mounted towards an aft end of the ship superstructure.

8. The flow control device of claim 6, wherein an edge of the second plate, opposite the edge connected to the hinge, is serrated to break up air vortexes.

9. The flow control device of the claim 6, wherein the edge of the second plate is serrated based on ship geometry, ship operational conditions, environmental conditions and aircraft operations.

10. The flow control device of claim 6, wherein a motor is connected to the hinge and the second plate to rotate the second plate between the position flush against the side of the superstructure and the position perpendicular to the side of the superstructure.

* * * * *